United States Patent
Borghesani

(10) Patent No.: US 9,541,419 B2
(45) Date of Patent: Jan. 10, 2017

(54) SYSTEMS AND METHODS FOR MONITORING VEHICLE HEALTH WITH CONNECTED APPLICATIONS

(71) Applicant: Cellco Partnership, Basking Ridge, NJ (US)

(72) Inventor: Linda Irene Borghesani, Acton, MA (US)

(73) Assignee: Cellco Partnership, Basking Ridge, NJ (US)

( * ) Notice: Subject to any disclaimer, the term of this patent is extended or adjusted under 35 U.S.C. 154(b) by 122 days.

(21) Appl. No.: 14/217,908

(22) Filed: Mar. 18, 2014

(65) Prior Publication Data

US 2015/0268059 A1    Sep. 24, 2015

(51) Int. Cl.
*G01M 17/00* (2006.01)
*G01C 21/36* (2006.01)
*G07C 5/00* (2006.01)

(52) U.S. Cl.
CPC .............. *G01C 21/3697* (2013.01); *G07C 5/00* (2013.01)

(58) Field of Classification Search
CPC ....... G01C 21/3697; G07C 5/00; G07C 5/008; G07C 5/085; G07C 5/0858; G06Q 30/02; G08G 1/20; G01S 5/0027
USPC ....... 701/30, 32.3, 33, 400; 707/3; 705/14.5, 705/14.62
See application file for complete search history.

(56) References Cited

U.S. PATENT DOCUMENTS

| | | | | |
|---|---|---|---|---|
| 6,459,967 B1* | 10/2002 | Otto | ................... | B60R 16/0231 701/29.1 |
| 6,526,335 B1* | 2/2003 | Treyz | .................... | G01C 21/26 307/10.1 |
| 7,449,995 B1* | 11/2008 | Clanton-Holloway | | G07C 5/006 340/438 |
| 2002/0044049 A1* | 4/2002 | Saito | ................. | B60G 17/0185 340/438 |
| 2003/0135304 A1* | 7/2003 | Sroub | .................... | G06Q 10/08 701/1 |
| 2006/0069523 A1* | 3/2006 | Kanekawa | .............. | G01P 3/489 702/84 |
| 2008/0161988 A1* | 7/2008 | Oesterling | ............. | G07C 5/008 701/31.4 |
| 2009/0100003 A1* | 4/2009 | Lahtinen | ................. | H04W 4/02 |
| 2009/0112393 A1* | 4/2009 | Maten | .................... | G01C 21/26 701/29.5 |
| 2009/0112470 A1* | 4/2009 | Wu | ..................... | B60C 23/0401 701/469 |
| 2010/0151838 A1* | 6/2010 | Wormald | ......... | G08G 1/096716 455/414.1 |

(Continued)

*Primary Examiner* — Shardul Patel

(57) ABSTRACT

Systems and methods that allow a user to enhance the experience on their mobile device and provide better information to make decisions based on sharing vehicle health information received from diagnostic systems on the car with applications on their mobile device. The system may receive trip information from a user device and vehicle health information from the vehicle and the user device. The system may generate an interactive map based on the trip information and the vehicle health information. The system may provide one or more notifications for the user based on the trip information and the vehicle health information. The system may receive calendar information and generate interactive maps and notifications based on the vehicle health information and the calendar information.

20 Claims, 4 Drawing Sheets

(56) References Cited

U.S. PATENT DOCUMENTS

| | | | | |
|---|---|---|---|---|
| 2011/0052042 | A1* | 3/2011 | Ben Tzvi | G06T 19/006 |
| | | | | 382/154 |
| 2011/0153459 | A1* | 6/2011 | Kirian | G06Q 10/06 |
| | | | | 705/26.82 |
| 2012/0296515 | A1* | 11/2012 | Boss | G01C 21/3453 |
| | | | | 701/32.3 |
| 2013/0211623 | A1* | 8/2013 | Thompson | G07C 5/008 |
| | | | | 701/2 |
| 2013/0218463 | A1* | 8/2013 | Howard | G06F 17/30657 |
| | | | | 701/533 |
| 2013/0226443 | A1* | 8/2013 | Scofield | B60R 16/0232 |
| | | | | 701/123 |
| 2013/0325341 | A1* | 12/2013 | van Os | G01C 21/3611 |
| | | | | 701/533 |
| 2014/0200739 | A1* | 7/2014 | Kirsch | G07C 5/008 |
| | | | | 701/1 |
| 2014/0279707 | A1* | 9/2014 | Joshua | G06Q 30/0283 |
| | | | | 705/400 |
| 2014/0375447 | A1* | 12/2014 | Raghunathan | H04L 67/10 |
| | | | | 340/462 |
| 2015/0019132 | A1* | 1/2015 | Gusikhin | G06Q 10/06311 |
| | | | | 701/537 |
| 2015/0183439 | A1* | 7/2015 | Jackson | G01C 21/3469 |
| | | | | 701/123 |
| 2015/0185030 | A1* | 7/2015 | Monroe | G01C 21/3438 |
| | | | | 701/532 |
| 2015/0198459 | A1* | 7/2015 | MacNeille | G01C 21/3697 |
| | | | | 701/22 |
| 2015/0239307 | A1* | 8/2015 | Horikoshi | B60C 23/0479 |
| | | | | 340/442 |

* cited by examiner

SYSTEMS AND METHODS FOR MONITORING VEHICLE HEALTH WITH CONNECTED APPLICATIONS

BACKGROUND INFORMATION

Today car manufactures are adding computers with entertainment, communication, and automobile health tracking information to automobiles. Additionally, there are many after market products that are meant to assist a customer to monitor and diagnose their cars by allowing them access to the information through a web portal or application on their smart phone device. Most of these products require internet connectivity through another device, such as a smart phone. There are many smart phone applications, such as mapping software, that allow a user to navigate to a destination. The mapping applications may be viewable on the built in electronic screen in the car but the applications and services are not integrated with the cars computer.

These and other drawbacks exist.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

Figure 1:
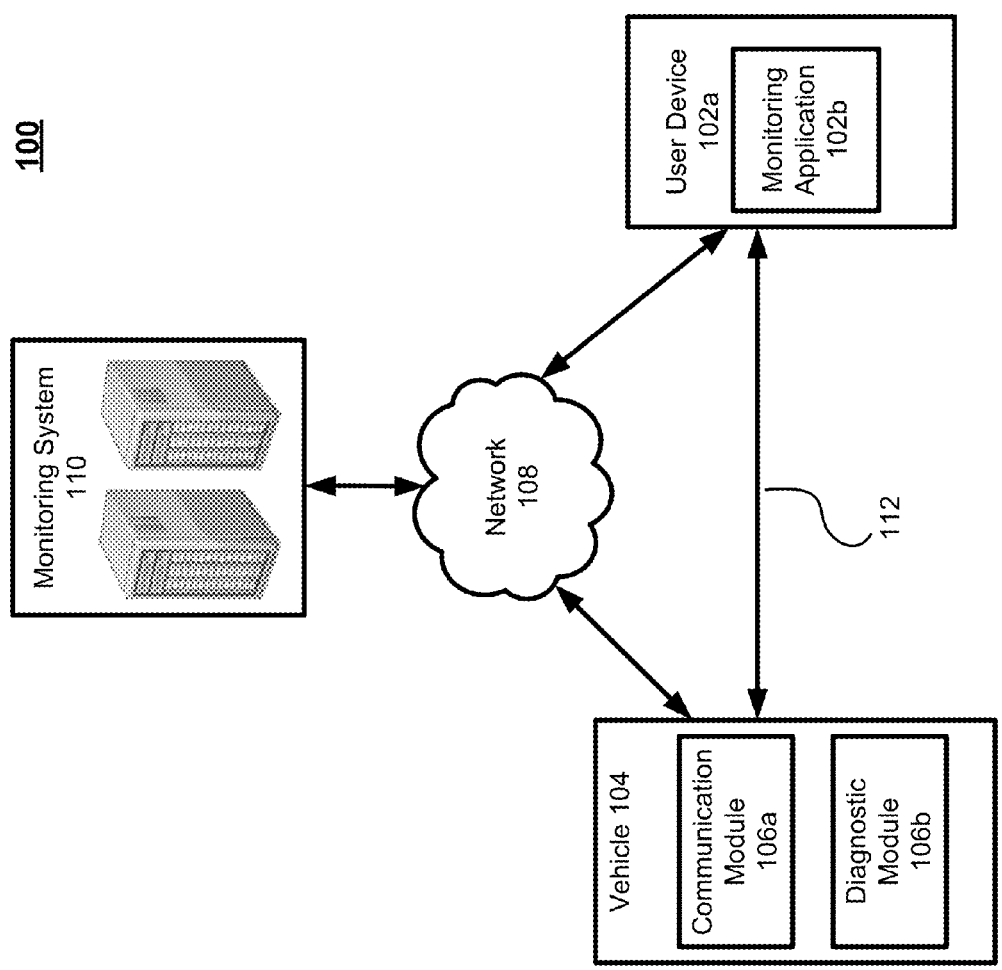
FIG. 1 is a schematic diagram illustrating a system according to a particular embodiment.

The embodiments disclosed herein include systems and methods that allow a user to enhance the experience on their mobile device and provide better information to make decisions based on sharing vehicle health information received from diagnostic systems on the car with applications on their mobile device. For example, a user may want to navigate to a location 1,000 miles away. The user may provide trip information to a remote system using an application on her mobile device. Diagnostic systems on the vehicle may provide vehicle health information to the remote system. The remote system may determine that the vehicle will need servicing at some point during the trip, and may provide servicing information to the user's mobile device. The servicing information may inform the user of the type of servicing that will be needed (e.g., oil change) and include points on a map displayed on the mobile device that represent servicing locations located along the route for the planned trip.

This system may inform the user where gas stations are located along the route. For example, if the user plans to travel 300 miles, but the car diagnostic systems determine that the vehicle gas tank needs to be refilled in 250 miles, the remote system may provide this information to the user's mobile device, and include points corresponding to gas stations on the planned route. The remote system may filter the information based on various parameters (e.g., lowest price for gas, gas stations no more than 10 miles from the planned route). This enhanced information may also apply to a specific type of food or other stop that can be located and the system may provide locations to stop along the route. The system may take into account traffic and/or weather data.

The smart phone and/or other internet accessible device may receive diagnostic and telemetry information from the car through wired or wireless technology and may connect to a host computer or cloud service. This type of interaction will allow for safer driving and better decision making capabilities from the user and could allow wired connections, blue tooth, NFC or other sharing technologies in order to communicate. This information may be automated while a driver is driving. Also, this information may be adjusted by a passenger and/or an SMS or through speech to a recipient and may be further integrated with calendar information, for example, providing information whether you have time to stop for coffee before an afternoon meeting, based on the current information.

The description below describes interface modules, user profile modules, mapping modules, vehicle diagnostic modules, notification modules, personal information modules, user devices, service providers, computer systems, and networks that may include one or more modules, some of which are explicitly shown while others are not. As used herein, the term "module" may be understood to refer to computing software, firmware, hardware, and/or various combinations thereof. It is noted that the modules are examples. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

It is further noted that software described herein may be tangibly embodied in one or more physical media, such as, but not limited to, a compact disc ("CD"), a digital versatile disc ("DVD"), a floppy disk, a hard drive, read only memory ("ROM"), random access memory ("RAM"), as well as other physical media capable of storing software, and/or combinations thereof. The functions described as being performed at various components may be performed at other components, and the various components may be combined and/or separated. Other modifications also may be made FIG. 1 is a schematic diagram illustrating a system according to particular embodiments. As illustrated in FIG. 1, system 100 may include a vehicle 104 comprising a communication module 106a and a diagnostic module 106b. Vehicle 104 may be a transportation device, a motorized vehicle, a bicycle, a car, an ambulance, a fire engine, a bus, a truck, a van, a motorcycle, a train, a ship, an aircraft, a spacecraft, and other mobile vehicles. The mobile vehicles 104 may also include a petroleum powered vehicle, a nuclear powered vehicle, a wind powered vehicle, an electric powered vehicle, a solar powered vehicle, a jet powered vehicle, and other types of powered vehicles.

Communication module 106a may comprise one or more communication devices located on-board vehicle 104. Communication module 106a may comprise one or more transceivers. Communication module 106a may be configured to communicate vehicle health information to user device 102a via network 108 and/or direct communication method 112. Communication module 106a communicate directly with user device 102a using Bluetooth and/or Near Field Communications (NFC), Smart share, or other forms of direct communication. Communication module may use a wireless form of communication with user device 102a. User device 102a may connect with communication module 106a using an wired connection (such as an auxiliary cable or USB connection). Communication device 106a may include an interactive display that receives commands and input from the driver of vehicle 104 and/or the user of user device 102a.

Diagnostic module 106b may comprise one or more sensors that monitor vehicle health information of vehicle 104. Diagnostic module 106b may monitor the tire pressure of each tire on vehicle 104. Diagnostic module 106b may monitor fluid levels in vehicle 104 (such as oil, coolant, transmission fluid, etc.). Diagnostic module 106b may monitor gas tank levels. Diagnostic module 106b may monitor battery health for vehicle 104. Diagnostic module may monitor engine temperature for vehicle 104. Diagnostic module 106b may monitor engine revolutions per minute (RPMs) for vehicle 104. Diagnostic module 106b may transmit vehicle health information to communication module 106a, which then transmits this information to monitoring system 110 and/or user device 102a.

User device 102a may be, for example, but not limited to, a cellular telephone, Session Initiation Protocol ("SIP") phone, software client/phone, a desktop computer, a laptop/notebook, a server, a module, a satellite phone, a personal digital assistant ("PDA"), a tablet computer, a smart phone, a remote controller, a personal computer ("PC"), a workstation, a handheld PC, a handheld MP3 player, a handheld video player, a personal media player, a gaming device, a thin system, a fat system, a network appliance, and/or other mobile communication device that may be capable of transmitting and/or receiving data. Also, user device 102a may include one or more transmitters, receivers, and/or transceivers to transmit and/or receive one or more signals to and/or from other components depicted in FIG. 1, including, for example, monitoring system 110 and communication module 106a.

Network 108 may be a wireless network, a wired network, or any combination of wireless network and wired network. For example, network 108 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, network 108 may include, without limitation, telephone line, fiber optics, IEEE Ethernet 802.3, a wide area network ("WAN"), a local area network ("LAN"), or a global network such as the Internet. Also, network 108 may support, an Internet network, a wireless communication network, a cellular network, or the like, or any combination thereof. Networks 108 may further include one, or any number of the exemplary types of networks mentioned above operating as a standalone network or in cooperation with each other. Network 108 may utilize one or more protocols of one or more network elements to which it is communicatively coupled. Networks 108 may translate to or from other protocols to one or more protocols of network devices. Although network 108 is depicted as one network, it should be appreciated that according to one or more embodiments, network 108 may comprise a plurality of interconnected networks, such as, for example, a service provider network, the Internet, a broadcaster's network, a cable television network, corporate networks, and home networks.

The components depicted in FIG. 1 may transmit and receive data to and from network 108 representing broadcast content, user request content, parallel search queries, parallel search responses, and other data. The data may be transmitted and received utilizing a standard telecommunications protocol or a standard networking protocol. For example, one embodiment may utilize Session Initiation Protocol ("SIP"). In other embodiments, the data may be transmitted and/or received utilizing other Voice Over IP ("VOIP") or messaging protocols. For example, data may also be transmitted and/or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving broadcast or parallel search data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Network 108 may use standard wireless protocols including IEEE 802.11a, 802.11b and 802.11g. Network 108 may also use protocols for a wired connection, such as an IEEE Ethernet 802.3.

Monitoring system 110 may include one or more devices, modules, and/or components for providing routing information for transmitting data over a network, such as, for example, an IP network and/or a PSTN. Monitoring system 110 may include a virtualized data storage pool hosted by one or more third parties, such as a service provider (not shown). Monitoring system 110 may comprise one or more distributed servers and may be used to store data objects for access by user device 102a, vehicle 104, and/or network 108. Monitoring system 110 may be accessed through a web service application programming interface (API), a cloud storage gateway or through a web-based user interface accessible by user device 102a and/or vehicle 104. Monitoring system 110 may be accessed through monitoring application 102b on user device 102a. Monitoring system 110 may communicate data with user device 102a and vehicle 104 using one or more networks, such as network 108.

Figure 2:
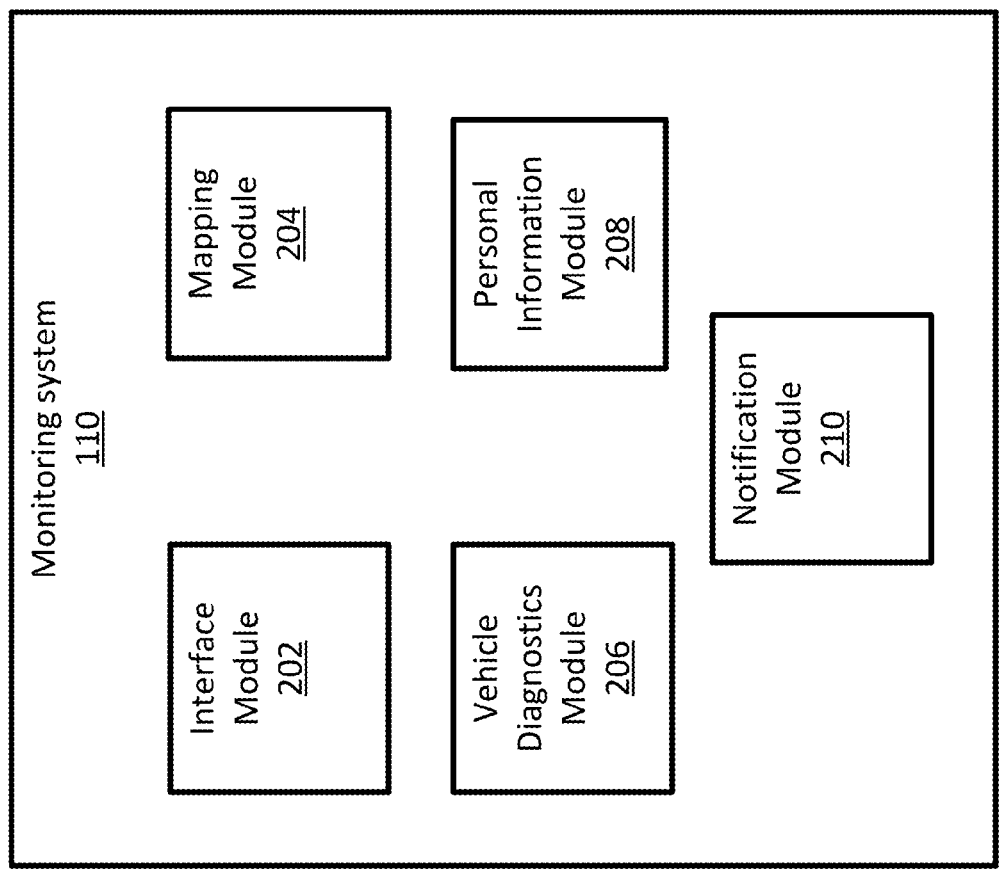
FIG. 2 is a block diagram of a hardware component of the monitoring system according to a particular embodiment.

Monitoring system 110 may include an interface module, a mapping module, a vehicle diagnostics module, a personal information module, and a notification module, as described herein in reference to FIG. 2. Also, in various embodiments, monitoring system 110 may be a resolution server or may be a module of, or communicatively coupled to, a Domain Name System ("DNS") server, such as a BIND server, for converting host names and domain names into IP addresses over the Internet. Monitoring system 110 may comprise one or more network enabled computers. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. In other embodiments, monitoring system 110 may be implemented as part of monitoring application 102b on user device 102a.

FIG. 2 is a block diagram of a hardware component of a monitoring system according to a particular embodiment. Monitoring system 110 may include interface module 202, a mapping module 204, a vehicle diagnostics module 206, a personal information 208, and a notification module 210. It is noted that the modules 202, 204, 206, 208, and 210 are exemplary and the functions performed by one or more of the modules may be combined with that performed by other modules. The functions described herein as being performed by the modules 202, 204, 206, 208, and 210 also may be separated and may be located or performed by other modules. Moreover, the modules 202, 204, 206, 208, and 210 may be implemented at other devices of the system 100 (e.g., user device 102a, and/or vehicle 104).

The interface module 202 may provide an interface between monitoring system 110 and user device 102a. The interface module 202 may include a user interface, e.g., a graphical user interface, an application programming interface (API) to interact with user device 102. User device 102 may interact with interface module 202 via an interface provided by monitoring application 102b. The interface module 202 may receive one or more queries or requests from a user and to provide the received queries or requests to other modules of the monitoring system 110. The interface module 202 may provide queries or requests to mapping module 204, wherein the queries or requests may determine an operation of the mapping module 204. In response to receiving a query or request from a user, the interface module 202 may provide the queries or requests (e.g., control signals, etc.) to the mapping module 204, vehicle diagnostics module 206, personal information module 208, and notification module 210.

In another exemplary embodiment, the interface module 202 may present information or data to the user via a display. The interface module 202 may display information or data upon a request from user device 102a, or the interface module 202 may automatically display information or data to user device 102a. User device 102a may interact with interface module 202 via monitoring application 102b using manual input (e.g., typing into a keyboard or keypad, etc.), voice input, touch screen input, graphical input (e.g., camera or camcorder) and/or any other method for inputting information or data.

Mapping module 204 may receive location information from user device 102a and/or vehicle 104. The location information may be in the form of GPS coordinates corresponding to the current location of user device 102a and/or vehicle 104. Mapping module 204 may receive trip information from user device 102a. Monitoring application 102b and/or interface module 202 may provide an graphical interface for the user of user device 102a to provide information associated with an upcoming trip. The trip information may include the date of the trip, the starting point and the destination (in the form of a street address, city, state, zip code, GPS coordinates, country, etc). The trip information may include one or more limits on the route. For example, the user may specify that the trip should avoid toll roads. The user may specify that the trip should include certain waypoints on the route (such as cities, tourist attractions, amusement parks, national parks, state parks, campgrounds, etc.). Mapping module 204 may access one or more mapping programs to determine a route for the user based in part on the trip information. Mapping module 204 may provide the route to user device 102a, where it may be displayed as an interactive map on the screen of user device 102a. Mapping module 204 may provide the route to communication module 106a, where it may be displayed as an interactive map for the driver of vehicle 104.

Vehicle diagnostics module 206 may receive vehicle health information from vehicle 104 and/or user device 102a. User device 102a may receive vehicle health information from vehicle 104 via direct communication method 112 (e.g., NFC, Bluetooth, auxiliary cable). User device 102a may then transmit vehicle health information to diagnostic module 206 via network 108. Vehicle diagnostics module 206 may request vehicle health information from vehicle 104 and/or user device 102a in response to mapping module 204 receiving trip information. Vehicle diagnostics module 206 may periodically request vehicle information from vehicle 104 and/or user device 102a.

Vehicle health information may include, without limitation, vehicle 104's make, model, year, weight, gas mileage, tire pressure (for each tire), oil levels, gas levels, transmission fluid levels, odometer reading, current speed, engine temperature, battery health. Vehicle health information may include the odometer reading from the time when the oil filter was last changed in vehicle 104. Vehicle health information may include the odometer reading for the time when the timing belt, or transmission was last changed. Vehicle health information may include an odometer reading for the last time the car had scheduled maintenance. Vehicle health information may include alerts that the timing belt needs to be replaced, or that vehicle 104 is due for scheduled maintenance. Vehicle health information may include the odometer reading from the time when new tires were installed on vehicle 104 and/or the odometer reading from the time when the tires were last rotated. Vehicle health information may include the mileage rating of the tires. Vehicle health information may include the make and model of vehicle 104. Vehicle health information may include the minimum tire pressure for the tires on vehicle 104. Vehicle health information may include vehicle 104's current velocity, direction, or current location. Vehicle health information may include telemetry information of vehicle 104, which may include brake application, emergency vehicle, turn signals, driving reverse, parked, lights on, component malfunctions, and other information associated vehicle 104.

In some embodiments, vehicle diagnostics module 206 may maintain a profile for vehicle 104 based in one or more databases (not shown). The profile may be based on information associated with vehicle 104 and/or the driver (e.g., the user of user device 102a). This may include vehicle 104's Vehicle Identification Number (VIN), license plate number, the driver's name, address, email address, phone number, driver's license number, etc. Vehicle diagnostics module 206 may periodically receive vehicle health information for vehicle 104 and store it in the profile for that vehicle and/or driver in the database. Each time vehicle diagnostics module 206 receives new vehicle health information, it may compare it to the information stored in vehicle 104's profile and update information that has changed. For example, when the driver purchases new tires for vehicle 104, he may use communication module to provide this information to monitoring system 110, or he may use user device 102a to provide this information to monitoring system 110. The information may include whether the tires are new or used, the mileage rating for each tire, the tire manufacturer, the type of tire (e.g., winter tires), and other information. This information may be stored in the user's profile maintained by vehicle diagnostics module 206 and/or a database associated with monitoring system 110.

Vehicle diagnostics module 206 may compare vehicle health information with the trip information received by mapping module 204. Vehicle diagnostics module 206 may compare the total distance of the trip with the vehicle health information. Vehicle diagnostics module 206 may compare the estimated time of the trip with the vehicle health information. Vehicle diagnostics module 206 may compare the route from map module 204 with the vehicle health information.

For example, user device 102a may provide trip information to monitoring system 110 indicating that the user is planning a trip with a total distance of 500 miles. The vehicle health information may indicate that the oil filter was changed when vehicle 104 had an odometer reading of 30,000 miles, and that the current odometer reading of vehicle 104 is 32,700 miles. Vehicle diagnostics module 206 may determine, based on the make and model of the vehicle 104, that vehicle 104 will need an oil change within the next 300 miles (if vehicle 104 requires an oil change every 3,000 miles). Vehicle diagnostic module 206 may create a diagnostic alert and provide it to mapping module 204 and notification module 210.

Mapping module 204 may receive the diagnostic alert. Based on the nature of the diagnostic alert, mapping module 204 may search various mapping databases to find locations for vehicle mechanics along the planned route. Mapping module 204 may update the route to include locations for mechanics. Mapping module 204 may provide the route on an interactive map that is displayed on user device 102a via monitoring application 102b. The route may include different locations showing where mechanics are located.

Notification module 210 may provide one or more notifications to user device 102a based on the diagnostic alert from vehicle diagnostics module 206. The notifications may be in the form of a text message, an SMS, an MMS, an audible notification, or other alert sent to user device 102a. The notification may appear via monitoring application 102b. The notification may inform the user of user device 102a the nature of the diagnostic alert. In the previous example, the notification may inform the user that vehicle 104 should get an oil change before the user leaves for the planned trip. The notification may also be sent to communication module 106a of vehicle 104.

In the same trip example, vehicle health information may indicate that vehicle 104 has enough gas for another 250 miles of highway driving. Vehicle diagnostics module 206 may determine that vehicle 104 will need to refill its tank on the trip (i.e., at some point on the route before vehicle 104 has traveled 250 of the 500 mile trip). Vehicle diagnostics module 206 may provide a diagnostic alert to notification module 210 that includes this information. Notification module 210 may send a notification to user device 102a and/or communication module 106a informing the user/driver that vehicle 104 should fill its tank at some point in the next 250 miles. Mapping module 204 may update the route provided to user device 102a and/or communication module 106a to include locations of gas stations near the 250 mile-marker of the route provided to user device 102a and/or communication module 106a.

In the same example, vehicle diagnostics module 206 may receive vehicle health information that indicates that the tires on vehicle 104 are rated for 30,000 miles, that they were purchased when vehicle 104 had an odometer reading of 50,000 miles, and that vehicle 104's current odometer reading is 79,600 miles. Because the trip information indicates that the tires will exceed their rated mileage while vehicle 104 is on the 500 mile trip, vehicle diagnostics module 206 may generate a diagnostic alert for mapping module 204 and/or notification module 210. Based on the diagnostic alert, mapping module 204 may provide user device 102a with a map showing the locations of tire dealers within a certain distance of user device 102a's current location. Mapping module 204 may update the route to include locations of mechanics and/or tire dealers along the route. Notification module 210 may transmit one or more notifications to user device 102a and/or communications module 106a that include information about vehicle 104's need for new tires before or during the planned trip. The one or more notifications may include contact information for local tire dealers and/or mechanics.

Notification module 210 and mapping module 204 may provide updated information based on the current location of user device 102a and/or vehicle 104. Vehicle 104 and/or user device 102a may periodically transmit their current location to monitoring system 110. If vehicle 104 is undertaking the planned trip, mapping module 204 may track how long vehicle 104 has been traveling. Mapping module 204 may update the route to include locations of nearby restaurants, fast food, hotels, and/or motels based at least in part on the current location of vehicle 104, the amount of time that vehicle 104 has been traveling, and/or the time of day. For example, if the current time is after 8 pm, mapping module 204 may update the route to include locations of nearby hotels. Notification module 210 may send notifications to user device 102a and/or communication module 106a, where the content of the notification is based at least in part on the current location of vehicle 104, the amount of time that vehicle 104 has been traveling, and/or the time of day. For example, if the current time is after 6 pm and vehicle 104 is on the trip, notification module 210 may send a notification to user device 102a and/or communication module 106a with an interactive feature that queries the driver of vehicle 104 and/or user of user device 102a whether he is interested in stopping for dinner. The notification may include contact information for nearby restaurants, fast food locations, convenience stores, hotels, and/or motels. The notification may query the user as to whether the user wants to hear more information. The notification may allow the user to select a time when the user/driver is planning to stop for dinner. Notification module 210 may receive the user's response, and mapping module 204 may provide locations of places to eat at the spot on the route where vehicle 104 is anticipated to be at the selected time (based on the current time, vehicle 104's current speed, and the current location of vehicle 104/user device 102a).

Interface module 202 may allow the user of user device 102a to specify preferences and/or limitations on the information displayed on the route provided by mapping module 204 and/or the notifications from notification module 210. User device 102a may specify that mapping module 204 should only display locations that are within a certain distance of the planned route. User device 102a may specify that mapping module 204 should only display the locations of certain restaurants (e.g., only Burger King locations), certain types of restaurants (e.g., only fast food), certain types of lodgings (e.g., only 4-star hotels), certain price ranges (e.g., only lodging that is less than $100/night), and other relevant limitations. Mapping module 204 may update the mapped route based on these limitations. Notification module 210 may provide notifications based on these limitations.

Personal information module 208 may receive calendar information from user device 102a and/or vehicle 104. User device 102a may include one or more scheduling programs and/or calendar programs. Calendar information may include the type of scheduled event (e.g., a meeting, an appointment, recreational activity, etc.), the date and time of the event, the event location (e.g., the street address, city, state, zip code, etc.), a brief description of the event, names and contact information for other people involved in the event, and other information. Personal information module 208 may periodically receive calendar information from user device 102a and/or vehicle 104. Personal information module 208 may coordinate with mapping module 204, vehicle diagnostics module 206, and notification module 210 to provide user device 102a and/or communication module 106a with relevant information based on the vehicle health information and the calendar information.

For example, the user of user device 102a may have a meeting stored in a calendar application on user device 102a. The meeting may be a business meeting on Mar. 10, 2014, at 2 pm, at 12340 Johnson Lane, Alexandria, Va. Personal information module 208 may receive the calendar information that includes these details. The meeting location may be 20 miles from user device 102a's and/or vehicle 104's current location. Vehicle diagnostics module 206 may receive vehicle health information for vehicle 104 indicating that vehicle 104 has enough gas left for 15 miles of driving. Vehicle diagnostics module 206 may compare the vehicle health information to the calendar information received by personal information module 208 and determine that vehicle 104 does not have enough gas to make the drive to the meeting location. Vehicle diagnostics module 206 may generate a diagnostic alert for mapping module 204 and/or notification module 210. Notification module 210 may transmit one or more notifications to user device 102a and/or communication module 106a. The notifications may inform the user/driver that vehicle 104 will need to be refilled before the March 10 meeting. The notifications may include locations of nearby gas stations. Mapping module 204 may provide one or more maps to user device 102a and/or communications module 106a that show the locations of gas stations that are nearby user device 102a's current location, that are on the route between the current location and the meeting location, and/or that are nearby the meeting location. The maps and notifications may be transmitted based on the current date and time (for example, the notification may be sent one day in advance of the meeting). The notification and map may include traffic information and/or weather information to inform the user/driver if he should leave earlier for the meeting.

In one embodiment, user device 102 may include an intermediate application configured to process vehicle health data that it receives directly from communications module 106a (via communications method 112). The intermediate application may be monitoring application 102b. The intermediate application may be a background application that works with in the background with the operating system of user device 102a without the user being aware of it. The intermediate application may convert the vehicle health data into a standardized format that is universally recognizable by a variety of other applications on user device 102a. The intermediate application may directly request vehicle health data from vehicle 104 using On-board diagnostics Parameter identifiers (PIDs) and convert the received data into a format that other applications would be able to read and process. In this way, different applications from different developers may interface with the intermediate application to use different components of the vehicle health information. The user device 102a would not need a single common user-accessible application to interface directly with communication module 106a, diagnostics module 106b, and/or vehicle 104. Instead, the intermediate application on user device 102a would communicate with communication module 106a and/or diagnostics module 106b (via communication method 112) and request vehicle health data on behalf of other applications running on user device 102a. Upon receiving the requested data, the intermediate application may then format the data so that the other applications on user device 102a can understand it. In other embodiments, the intermediate application may be incorporated into communications module 106a, diagnostics module 106b, and/or another component of vehicle 104.

Figure 3:
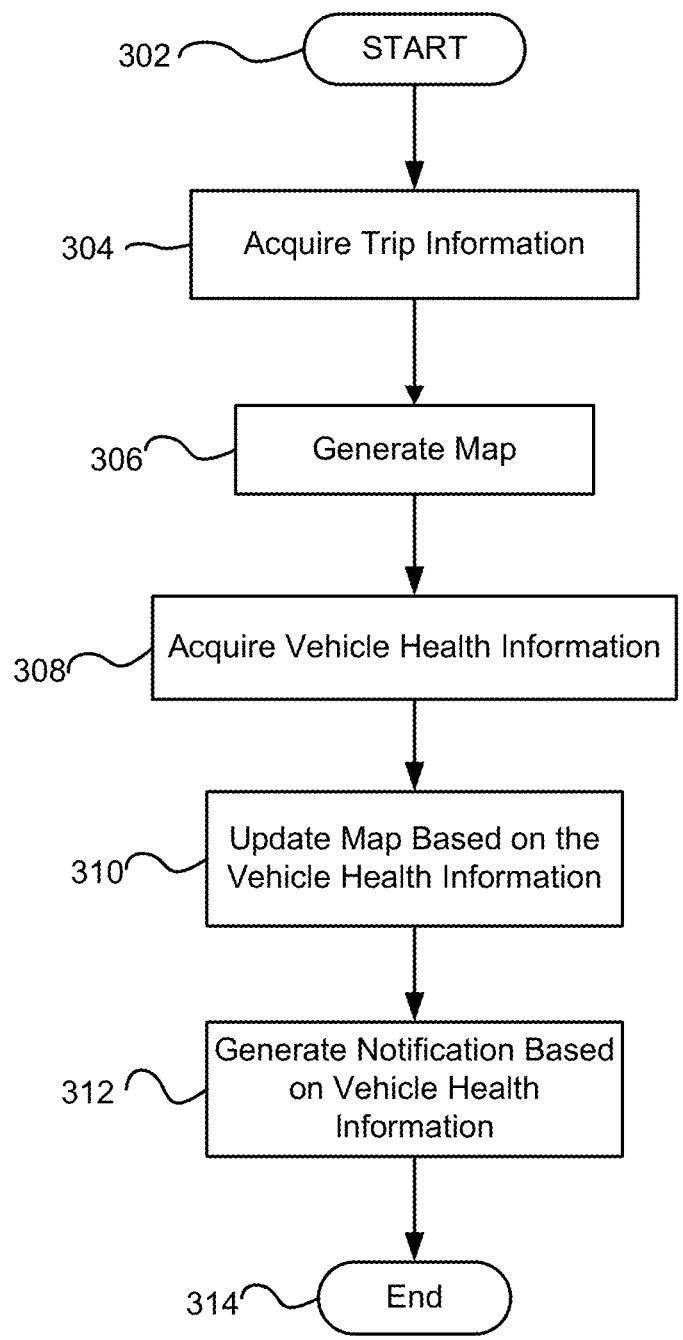
FIG. 3 is a flowchart illustrating the functionality for monitoring vehicle health according to a particular embodiment.

FIG. 3 is a flowchart illustrating the functionality for measuring vehicle health with connected devices and applications. This exemplary method 300 may be provided by way of example, as there are a variety of ways to carry out the method. The method 300 shown in FIG. 3 can be executed or otherwise performed by one or a combination of various systems. The method 300 is described below may be carried out by the systems and networks shown in FIGS. 1 and 2, by way of example, and various elements of the systems and networks are referenced in explaining the example method of FIG. 3. Each block shown in FIG. 3 represents one or more processes, methods or subroutines carried out in exemplary method 300. Referring to FIG. 3, exemplary method 300 may begin at block 302.

At block 302, the method 300 for measuring vehicle health with connected devices and applications may begin.

At block 304, a monitoring system 110 may acquire trip information. The trip information may be received from user device 102a and/or communication device 106a of vehicle 104. The trip information may include the date of the trip, the estimated departure time, the starting point and the destination (in the form of a street address, city, state, zip code, GPS coordinates, country, etc). The trip information may include one or more limits on the route. For example, the user may specify that the trip should avoid toll roads. The user may specify that the trip should include certain waypoints on the route (such as cities, tourist attractions, amusement parks, national parks, state parks, campgrounds, etc.). The trip information may include the current location of user device 102a and/or communication device 106a (corresponding to the current location of vehicle 104). For example, the user of user device 102a may be planning a trip from Richmond, Va. to Cincinnati, Ohio User may enter the starting point and destination using an interface provided by monitoring application 102b. The user may enter the departure date (Apr. 1, 2014). The user may enter one or more restrictions on the trip. For example, the user may want to stop in Huntington, W. Va. and may input this information using monitoring application 102b. Mapping module 204 may calculate the trip distance based on the starting and ending points, and the restrictions (~530 miles). After acquiring trip information, the method 300 may proceed to block 306.

At block 306, mapping module 204 may generate a map of a route based on the trip information. The route may be displayed on as an interactive map on user device 102a and/or communication module 106a. The route may include turn-by-turn directions. The route may include estimated time for the trip. The route may include traffic information (e.g., traffic jams, accidents, road construction). Continuing with the previous example, mapping module 204 may generate a route from Richmond to Cincinnati that goes through Huntington, W. Va. The user of user device 102a may see the route on the screen of user device 102a and/or via communication module 106a of vehicle 104. Method 300 may proceed to block 308.

At block 308, vehicle diagnostics module 206 may acquire vehicle health information from diagnostics module 106b and/or user device 102a. Vehicle health information may include, without limitation, vehicle 104's make, model, year, weight, gas mileage, tire pressure (for each tire), oil levels, gas levels, transmission fluid levels, current odometer reading, current speed, engine temperature, battery health. Vehicle health information may include the odometer reading from the time when the oil filter was last changed in vehicle 104. Vehicle health information may include the odometer reading from the time when new tires were installed on vehicle 104 and/or the odometer reading from the time when the tires were last rotated. Vehicle health information may include the mileage rating of the tires. Vehicle health information may include the make and model of vehicle 104. Vehicle health information may include the minimum tire pressure for the tires on vehicle 104. Vehicle health information may include vehicle 104's current velocity, direction, or current location. Vehicle health information may include telemetry information of vehicle 104, which may include brake application, emergency vehicle, turn signals, driving reverse, parked, lights on, component malfunctions, and other information associated vehicle 104.

Continuing with the previous example, vehicle 104 may have a current odometer reading of 50,000 miles. Vehicle 104 may have last had an oil change at 47,200 miles. The vehicle health information may indicate that for this make and model, the oil filter should be replaced every 3,000 miles. Vehicle 104 may have a 15 gallon gas tank that is half full, and may have an average gas mileage rating of 30 miles/gallon. Vehicle diagnostics module 206 may compare the vehicle health information to the trip information. Vehicle diagnostics module 206 may compare the total trip distance (515 miles) with the number of miles vehicle 104 may be able to drive on its current tank of gas (~30/miles to the gallon*7.5 gallons=225 miles). Vehicle diagnostics module 206 may compare the total trip distance with the amount of miles remaining before the oil filter should be changed (3,000−(50,000−47,200)=200 miles). Vehicle diagnostics module 206 may determine that vehicle 104 will need its gas tank refilled approximately 225 miles into the trip, and change the oil filter approximately 200 miles into the trip. Method 300 may proceed to block 310.

At block 310, mapping module 204 may update the map of the route based on the comparison between the vehicle health information and the trip information. The map of the route may be updated to include locations of service stations, mechanics, gas stations, car dealerships, and other similar locations that can provide vehicle services for vehicle 104. The locations may be at points along the route where vehicle diagnostics module 206 determines that those services will be needed, based on the comparison performed in block 308. The locations may be nearby the current location of vehicle 104 and/or user device 102a. The locations added to the map may be limited based on preferences specified by the user of user device 102a (using monitoring application 102b and/or communication module 106a). The user may request to see only the locations offering the lowest prices. The user may request to see only locations within a maximum distance of the route. The user may request to have the map only display locations of a certain business (e.g., only Shell stations). Other limitations may be applied.

The updated map may be displayed for the user on user device 102a and/or communication module 106a. The updated route may be an interactive map similar to the one generated in block 306. Continuing with the previous example, mapping module 204 may create an updated route from Richmond to Cincinnati (with a stop in Huntington, W. Va.) that includes locations of gas stations within a certain distance of the 225-mile point of the route. The updated map may include locations of mechanics and automotive shops within a certain distance of the 200 mile-point of the route (where vehicle 104 may get the oil filter changed). The updated map may include locations of mechanics within a certain distance of vehicle 104 and/or user device 102a's current location (in case user 102a would like to change the oil filter before he leaves on the trip). Method 300 may proceed to block 312.

At block 312, the notification module 210 may generate a notification based on the comparison between the vehicle health information and the trip information. The notifications may be in the form of a text message, an SMS, an MMS, an audible notification, or other alert sent to user device 102a and/or communications module 106a. The notification may include content that informs the user of user device 102a/driver of vehicle 104 of the new information added to the updated map generated in block 310. Continuing with the previous example, user device 102a may receive a notification informing the user that he does not have enough gas in the tank for the planned trip. The notification may include contact information and locations of various gas stations near the current location of user device 102a. The notification may include an interactive component requesting whether the user would like to fill up his tank before he leaves or while on the trip. Notification module 210 may receive a response from user device 102a to the initial notification. If the user indicates he wants to fill up on the trip, notification module 210 may generate a second notification and transmit it to user device 102a and/or communication module 106a after the vehicle 104 has embarked on the planned trip. Notification module 210 may generate a notification informing the user that vehicle 104 will need its oil filter replaced during the trip. The notification may include contact information for nearby mechanics. The notifications may be transmitted the day before the departure date for the trip. The user may specify how far in advance of the trip departure date he would like to receive notifications (using the interface on monitoring application 102b). Method 300 may proceed to block 314.

At block 314, the method 300 may end.

Figure 4:
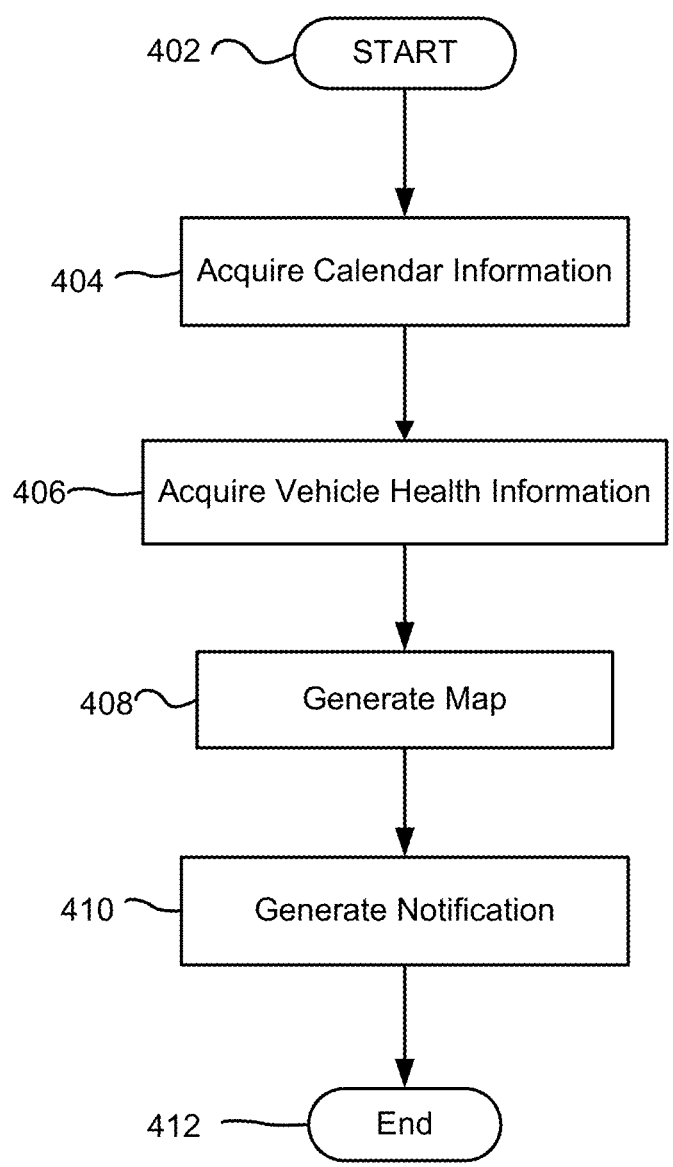
FIG. 4 is a flowchart illustrating the functionality for monitoring vehicle health according to a particular embodiment.

FIG. 4 is a flowchart illustrating the functionality for measuring vehicle health with connected devices and applications. This exemplary method 400 may be provided by way of example, as there are a variety of ways to carry out the method. The method 400 shown in FIG. 4 can be executed or otherwise performed by one or a combination of various systems. The method 400 is described below may be carried out by the systems and networks shown in FIGS. 1 and 2, by way of example, and various elements of the systems and networks are referenced in explaining the example method of FIG. 4. Each block shown in FIG. 4 represents one or more processes, methods or subroutines carried out in exemplary method 400. Referring to FIG. 4, exemplary method 400 may begin at block 402.

At block 404, the personal information module 208 may acquire calendar information from user device 102a and/or communication module 106a. Calendar information may include the type of scheduled event (e.g., a meeting, an appointment, recreational activity, etc.), the date and time of the event, the event location (e.g., the street address, city, state, zip code, etc.), a brief description of the event, names and contact information for other people involved in the event, and other information. Personal information module 208 may periodically receive calendar information from user device 102a and/or vehicle 104. The user/driver may configure monitoring application 102b and/or communication device 106a to provide calendar information to personal information module 208 on a regular basis.

For example, the user of user device 102a may have an appointment stored in a calendar application on user device 102a. The appointment may be a doctor's appointment on Mar. 31, 2014, at 8 am, at 12340 Washington St, Richmond, Va. The calendar information may include the name of the doctor, the doctor's contact information, and the purpose of the event (physical exam). Method 400 may proceed to block 406.

At block 406, vehicle diagnostics module 206 may acquire vehicle health information. This process may be the same as block 308 in FIG. 3. Continuing with the previous example, vehicle health information may indicate that the tire pressure for vehicle 104 is low. Diagnostics module 106b may transmit this information to user device 102a, which may transmit it to vehicle diagnostics module 206. Method 400 may proceed to block 408.

At block 408, mapping module 204 may generate a map based on the calendar information and the vehicle health information. Vehicle diagnostics module 206 and/or mapping module 204 may compare the calendar information with the vehicle health information. Mapping module 204 and/or vehicle diagnostics module 206 may determine that vehicle 104 needs to have its tires inflated. Mapping module 204 may generate a map showing a route from vehicle 104 (or user 102a)'s current location to the doctor's office. The map may include locations of gas stations and/or other service stations where vehicle 104's tires may be inflated. The map may highlight locations that are near the doctor's office and/or along the route between vehicle 104's current location and the doctor's office. Note, the starting point for the route may be another location specified by the user/driver (e.g., the user's home, place of employment, restaurant). As with the map generated in block 310 of FIG. 3, the locations on the map may be filtered based on preferences specified by the user. The map may be presented on user device 102a and/or communications module 106a within a certain minimum amount of time of the appointment time (e.g., mapping module 204 may display the map 24 hours before the appointment). Method 400 may proceed to block 410.

At block 410, notification module 210 may transmit one or more notifications to user device 102a and/or communication module 106a, based on the calendar information and the vehicle health information. In this example, the notification may inform the user/driver that the tires on vehicle 104 are low on air and need to be refilled. The notification may include interactive features asking the user whether he would like to refill his tires before or after the doctor's appointment. The notification may ask the user whether he would like to refill his tires on the way to or from the doctor's appointment. The user may respond to the notification via monitoring application 102b and/or communication module 106a. Mapping module 204 may update the map based on the user's response to the one or more notifications. In one embodiment, blocks 310 and 308 may be reversed (e.g., the mapped route provided by the mapping module 204 may be dependent on the user's responses to the notifications). Notifications may be transmitted based on the current date and time (for example, the notification may be sent one day in advance of the appointment). The notification and map may include traffic information and/or weather information to inform the user/driver if he should leave earlier for the appointment. The notification may recommend other places of interest that are located on the route to the doctor's office. For example, the notification may ask the user if he would like to get coffee on the way to or from the doctor's office. If the user responds affirmatively, the mapping module 204 may update the route to include locations of coffee shops located on the route.

At block 412, the method may end.

The various computing devices above (including phones and network equipment), generally include computer-executable instructions, where the instructions may be executable by one or more processors. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

Databases, data repositories or other data stores described herein, such as the data storage 120, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary. The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system, comprising:
    one or more processors to:
        identify a starting location based on GPS coordinates of a current location of a vehicle,
        receive information identifying an ending location,
        determine at least one route between the starting location and the ending location,
        monitor vehicle health information associated with the vehicle by using one or more sensors,
            the vehicle health information including information regarding when tires of the vehicle were installed or rotated,
        determine a total trip distance based on the at least one route,
        determine an amount of mileage remaining on at least one tire, of the tires, based on the information regarding when the tires were installed or rotated,
        compare the total trip distance with the amount of mileage remaining on the at least one tire,
        generate one or more diagnostic alerts based on comparing the total trip distance with the amount of mileage remaining on the at least one tire, and
        provide one or more notifications based on the one or more diagnostic alerts,
            the one or more notifications including a notification regarding the tires.

2. The system of claim 1, wherein the one or more processors are further to:
    identify at least one of a departure date or a limitation on the at least one route, and
    generate an interactive map of the at least one route between the starting location, the ending location, and the at least one of the departure date or the limitation on the at least one route.

3. The system of claim 2, wherein the vehicle health information further comprises at least one of:
    an oil level of the vehicle,
    an engine temperature of the vehicle,
    a coolant level of the vehicle,
    a transmission fluid level of the vehicle,
    battery health of the vehicle,
    a first odometer reading at a first time when an oil filter of the vehicle was last replaced,
    a second odometer reading at a second time when a timing belt was last replaced, or
    a third odometer reading at a third time when the tires were last replaced.

4. The system of claim 1, wherein the one or more notifications further include one or more of:
    information identifying at least one service station located within a distance of the at least one route, or
    information identifying at least one mechanic located within the distance of the at least one route.

5. The system of claim 1, wherein the one or more notifications further include content informing a recipient device of a need to at least one of:
    replace an oil filter of the vehicle,
    replace a battery of the vehicle,
    or
    refill transmission fluid of the vehicle.

6. The system of claim 1, wherein the one or more processors are further to:
    receive calendar information,
    generate one or more second diagnostic alerts based on the calendar information and the vehicle health information,
    provide one or more second notifications based on the one or more second diagnostic alerts, and
    update an interactive map with content based on the one or more second diagnostic alerts.

7. The system of claim 1, where the one or more processors are further to:
    generate an interactive map of the at least one route, and
    update the interactive map with additional content based on the one or more diagnostic alerts.

8. A method, comprising:
    identifying, by one or more devices, a starting location of a trip based on GPS coordinates of a vehicle;
    identifying, by the one or more devices, an ending location of the trip;
    determining, by the one or more devices, at least one route between the starting location and the ending location;
    monitoring, by the one or more devices, vehicle health information associated with the vehicle by using one or more sensors,
        the vehicle health information including information regarding when an oil filter of the vehicle was changed;
    determining, by the one or more devices, a total trip distance based on the at least one route;
    determining, by the one or more devices and based on the vehicle health information, an amount of miles remaining before service related to the oil filter is needed,
    comparing, by the one or more devices, the total trip distance with the amount of miles remaining before the service related to the oil filter is needed; and
    generating, by the one or more devices, one or more diagnostic alerts based on comparing the total trip distance with the amount of miles remaining,
        the one or more diagnostic alerts including information regarding the oil filter;

and
providing, by the one or more devices, one or more notifications based on the one or more diagnostic alerts.

9. The method of claim 8, wherein the vehicle health information further comprises at least one of:
information regarding a pressure of a tire of tires of the vehicle, or
an odometer reading at a time the tires were last replaced.

10. The method of claim 8, wherein the one or more notifications include one or more of:
information identifying at least one service station located within a distance of the at least one route, or
information identifying at least one mechanic located within the distance of the at least one route.

11. The method of claim 8, wherein the one or more notifications provide content informing a need to at least one of:
change tires of the vehicle,
replace the oil filter of the vehicle,
replace a battery of the vehicle, or
take the vehicle to a mechanic.

12. The method of claim 8, further comprising:
receiving, from a recipient device, a response to the one or more notifications; and
transmitting, to the recipient device, another notification based on the response.

13. The method of claim 8, further comprising:
generating an interactive map of the at least one route, and updating the interactive map with additional content based on the one or more diagnostic alerts.

14. A non-transitory computer-readable storage medium comprising instructions, the instructions comprising:
one or more instructions that, when executed by at least one processor, cause the at least one processor to:
receive information identifying a starting location and an ending location;
generate an interactive map of a route between the starting location and the ending location;
monitor vehicle health information associated with a vehicle,
the vehicle health information including information regarding when tires of the vehicle were installed or rotated;
determine a total trip distance based on the route;
determine an amount of mileage remaining on at least one tire, of the tires, based on the information regarding when the tires were installed or rotated;
compare the total trip distance with the amount of mileage remaining on the at least one tire;
determine particular information based on comparing the total trip distance with the amount of mileage remaining on the at least one tire,
the particular information relating to servicing the at least one tire; and
update the interactive map with additional content based on the particular information.

15. The non-transitory computer-readable storage medium of claim 14, wherein the additional content includes information identifying a location along the route.

16. The non-transitory computer-readable storage medium of claim 15, wherein the location is where servicing the at least one tire will be needed.

17. The non-transitory computer-readable storage medium of claim 15, wherein the location is of a service station, a mechanic, a gas station, or a dealership.

18. The non-transitory computer-readable storage medium of claim 14, wherein the vehicle health information further includes information regarding tire pressure of the tires.

19. The non-transitory computer-readable storage medium of claim 14, wherein the instructions further comprise:
one or more instructions that, when executed by the at least one processor, cause the at least one processor to:
determine calendar information of a user of the vehicle; and
provide, to a device of the user, a notification based on the particular information and the calendar information.

20. The non-transitory computer-readable storage medium of claim 19, wherein the notification includes an inquiry regarding whether the user wants to service the at least one tire before or after a particular appointment of the user.

* * * * *